(12) United States Patent
Eifert et al.

(10) Patent No.: US 10,483,600 B2
(45) Date of Patent: Nov. 19, 2019

(54) METHOD FOR OPERATING A BATTERY

(71) Applicant: FORD GLOBAL TECHNOLOGIES, LLC, Dearborn, MI (US)

(72) Inventors: Mark Eifert, Frankfurt am Main (DE); Eckhard Karden, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 397 days.

(21) Appl. No.: 15/096,985

(22) Filed: Apr. 12, 2016

(65) Prior Publication Data
US 2016/0308259 A1 Oct. 20, 2016

(30) Foreign Application Priority Data

Apr. 16, 2015 (DE) ........................ 10 2015 206 878

(51) Int. Cl.
| | |
|---|---|
| H01M 10/48 | (2006.01) |
| H01M 10/06 | (2006.01) |
| H01M 10/0525 | (2010.01) |
| H01M 10/44 | (2006.01) |
| F02D 41/06 | (2006.01) |
| F02D 41/22 | (2006.01) |
| B60L 58/16 | (2019.01) |

(52) U.S. Cl.
CPC .......... *H01M 10/48* (2013.01); *H01M 10/44* (2013.01); *H01M 10/486* (2013.01); *B60L 58/16* (2019.02); *F02D 41/062* (2013.01); *F02D 41/22* (2013.01); *H01M 10/06* (2013.01); *H01M 2220/20* (2013.01); *Y02E 60/126* (2013.01)

(58) Field of Classification Search
None
See application file for complete search history.

(56) References Cited

U.S. PATENT DOCUMENTS

| | | | |
|---|---|---|---|
| 4,937,528 A | 6/1990 | Palanisamy | |
| 5,166,595 A * | 11/1992 | Leverich | H02J 7/008 320/139 |
| 6,232,743 B1 | 5/2001 | Nakanishi | |
| 6,414,465 B1 * | 7/2002 | Banks | H01M 10/48 320/118 |
| 6,424,157 B1 | 7/2002 | Gollomp et al. | |
| 6,861,842 B2 | 3/2005 | Baeuerlein et al. | |
| 6,920,404 B2 | 7/2005 | Yamanaka et al. | |
| 7,355,411 B2 | 4/2008 | Murakami et al. | |
| 7,492,126 B2 | 2/2009 | Hogari et al. | |
| 7,554,296 B2 | 6/2009 | Mizuno et al. | |
| 7,679,328 B2 | 3/2010 | Mizuno et al. | |
| 7,990,111 B2 | 8/2011 | Mizuno et al. | |

(Continued)

FOREIGN PATENT DOCUMENTS

EP 1598913 B1 11/2005

*Primary Examiner* — Amanda J Barrow
(74) *Attorney, Agent, or Firm* — Frank Lollo; Brooks Kushman P.C.

(57) ABSTRACT

This disclosure relates to a method for operating a battery of a motor vehicle, wherein parameters are continuously monitored by means of a system of the motor vehicle, said parameters representing the state of the battery, and at least one risk minimizing strategy that includes measures for changing the battery situation is implemented if an evaluating unit of the system generates an alarm signal on the basis of a parameter that is being monitored.

6 Claims, 5 Drawing Sheets

(56) References Cited

U.S. PATENT DOCUMENTS

| | | |
|---|---|---|
| 8,773,136 B2 | 7/2014 | Fricke et al. |
| 2004/0113629 A1 | 6/2004 | Laig-Hoerstebrock et al. |
| 2007/0080662 A1 | 4/2007 | Wu |
| 2009/0027056 A1 | 1/2009 | Huang et al. |
| 2009/0243547 A1 | 10/2009 | Andelfinger |
| 2011/0106280 A1* | 5/2011 | Zeier .................... H01M 10/42 700/90 |
| 2013/0066573 A1* | 3/2013 | Bond ................. G01R 31/3679 702/63 |

* cited by examiner

METHOD FOR OPERATING A BATTERY

CROSS-REFERENCE TO RELATED APPLICATIONS

This application claims foreign priority benefits under 35 U.S.C. § 119(a)-(d) to DE 10 2015 206 878.1, filed Apr. 16, 2015, which is hereby incorporated by reference in its entirety.

TECHNICAL FIELD

This disclosure relates to a method for operating a battery of a motor vehicle, wherein parameters that represent the state of the battery are monitored.

BACKGROUND

The battery can be by way of example a starter battery of a motor vehicle. The battery is a rechargeable battery that provides electric current for a starter motor of an internal combustion engine. In contrast, the battery of an electric vehicle that is used to drive the vehicle is described as a traction battery. In addition thereto, electric vehicles or hybrid vehicles can also comprise a starter battery. Lead rechargeable batteries or lithium ion rechargeable batteries can be used as batteries, however, both batteries are referred to hereunder as lead batteries or lithium ion batteries.

If lead batteries or lead rechargeable batteries age and by way of example begin to produce a gas owing to internal short circuits or other mechanisms, it is typical for the temperature of said batteries to increase. This can lead to greatly increased temperatures to the extent that the electrolyte begins to boil and to leak from the battery. Acidic vapor, water vapor and/or smoke that occurs in this manner represents a potential safety risk for people or can at least be a reason for a customer to be dissatisfied as such batteries spread unpleasant smells. This is critical in particular in the technical field of plug-in electric vehicles or plug-in hybrid vehicles that are often left unattended for a long period of time whilst charging the battery.

In the case of aging lead batteries, internal corrosion and a high internal resistance can also occur as side effects. Owing to the high internal resistance and decreased capacity, said batteries are by way of example no longer capable of providing energy with a voltage that is sufficient to start up the vehicle. In addition, electrical loads that draw more current than the generator or the DC-DC converter of the vehicle is designed to supply cause voltage transients on the battery connectors when discharging, which can decrease the electrical functionality of this or other loads. By way of example, it is possible for the transients to cause control procedures in the vehicle to be shut down and restarted if their low voltage operating limits are not adhered to.

In addition, in the case of batteries that display these symptoms, it can be assumed that said batteries will probably fail within a foreseeable period of time. This failure of functionality of a battery and therefore a malfunction of a vehicle should be avoided at all costs. This can occur by way of example by virtue of a driver or service personnel drawing attention to an impending battery failure in good time. Different parameters can be drawn upon as indicators for a defective battery.

Warning notifications to the driver or a customer service agent are however dependent upon these persons reacting to said notifications in order to change the critical battery situation. If this does not occur in good time, damage and/or a limitation of the vehicle functionality can already have occurred. Vehicle failures owing to acute battery problems are not easily prevented and measures of this type, in particular in the case of unattended charging procedures by way of example of plug-in electric vehicles or plug-in hybrid vehicles, are often not suitable for averting damage to the battery or to the vehicle. This can occur by way of example as a result of exchanging the battery, however a leakage of vapor from the battery or even a battery failure can also occur prior to exchanging the battery.

SUMMARY

The object of the invention is therefore to provide a method that is intended for reliably operating a battery, which solves this problem.

It is to be noted that the features explained individually in the claims can be mutually combined in any technically expedient manner and disclose additional embodiments of the invention. The description characterizes and specifies the invention in particular in connection with the figures.

The method in accordance with the invention for operating a battery of a motor vehicle characterized by virtue of the fact that parameters that directly or indirectly represent the state of the battery are continuously monitored by means of a system of the motor vehicle. If an evaluating unit of the system generates an alarm signal on the basis of such a monitored parameter, at least one risk minimizing strategy that includes measures for changing the battery situation is implemented. If a state of the battery is consequently identified by means of a monitored parameter and said state indicates a weakened or even damaged battery, by way of example not only a warning notification is displayed on the dashboard or an error code stored in a diagnostic system of the vehicle. On the contrary, a risk minimizing strategy is automatically introduced by the system of the vehicle as a reaction to an alarm signal of the evaluating unit and the battery situation is changed with said strategy in order to thus alleviate the situation.

The invention consequently aims to actively engage in the situation of the battery by way of a vehicle-internal risk minimizing strategy in order to reduce the damage. These are overriding reactive measures since said measures can be introduced as a reaction to a damaged battery. However, these can also be preventative measures if by way of example a charging procedure is cancelled or not begun in the first place if the ambient temperature of the battery is identified as being too high. Situations of this type can otherwise lead to the battery producing a lot of gas and the charging procedure becoming risky.

It is possible with the method in accordance with the invention to immediately alleviate critical situations of a battery, wherein measures are introduced by the vehicle without a driver or service personnel having to be involved. Critical situations can thus be immediately alleviated in particular in the case of unattended charging procedures or during the driving operation and the risk of a vehicle failure is reduced.

The measures of the risk minimizing strategy are selected preferably in dependence upon the type of the parameter, the monitoring of which has led to the evaluating unit generating an alarm signal. If by way of example a high internal resistance of the battery is identified, which is an indication of corrosion and sulfation of the battery, the risk minimizing strategy can set the desired value for the charging voltage as particularly high for a particularly long period of time in order to detach the sulfation from the plates. Consequently, one embodiment of the invention also provides that a desulfation procedure of the battery is performed as a measure of the risk minimizing strategy in the case of an increased internal resistance of the battery.

If, on the other hand, an increased internal temperature of the battery is established, which indicates a weakened or damaged battery (degraded battery), the charging current can be reduced or the battery can even be disconnected from the current source. Consequently, measures of a risk minimizing strategy in particular can also include reducing the charging current of the battery and/or disconnecting the battery from the current source. Disconnecting the battery from the current source can occur by way of example by way of a relay or the entire vehicle is shut-down during a plug-in charging procedure at a plug socket.

The temperature parameter would directly represent the state of the battery, namely that said battery is by way of example too hot, while other parameters that are monitored such as by way of example changes in the charging current, only indirectly represent the state of the battery. The method in accordance with the invention can be used in conjunction with monitoring those parameters that are suitable for representing the state of a battery.

In addition, in one embodiment of the invention, the measures of the risk minimizing strategy are selected in dependence upon the prevailing operating mode of the motor vehicle. By way of example, during the charging procedure of a plug-in vehicle, the vehicle is entirely shut down in order to prevent negative consequences but while driving the vehicle, only the charging current is reduced. If a desulfation of the battery is to be performed, this can occur during the charging procedure at a plug socket in order to avoid negative effects such as a reduction in range and/or an increased fuel consumption. If a desulfation procedure is to be avoided when driving the vehicle, a risk minimizing strategy can consequently also introduce delayed measures. In particular, this can include that measures are only introduced if the vehicle is in a specific operating mode. By way of example, the strategy can also provide that the desulfation procedure is especially not performed during the charging procedure in order to avoid an unattended charging procedure of a damaged battery.

At least one or more parameters from the group below can be monitored as a parameter of the battery:

Temperature gradient of the internal temperature of the battery;

Charging current of the battery;

Internal resistance of the battery; and

Water loss of the battery.

This can be complemented by means of any other parameters that are suitable for the purpose of characterizing a critical state of the battery.

In one embodiment of the invention, a desulfation procedure of the battery is provided as a measure of the risk minimizing strategy if the internal resistance of the battery exceeds a limit value. The increased internal resistance indicates an internal corrosion of the battery that could however have also been caused as a result of sulfation of the battery. In order to exclude this, the desulfation procedure is performed by way of example over a defined period of time and the evaluating unit generates an alarm signal if the internal resistance of the battery still lies above a limit value after this period of time has elapsed. In this case, it can be assumed that the internal resistance was increased as a result of an internal corrosion and not as a result of sulfation of the battery because in that case said resistance would have fallen to below the relevant limit value as a result of the desulfation procedure. Erroneous alarm signals owing to sulfation can be avoided in this manner. The desulfation procedure is performed preferably by means of charging the battery with a voltage desired value that corresponds at least to the equalizing charge of the battery.

In the case of the equalizing charge, a voltage desired value is used that renders it possible to completely charge all the cells in a lead rechargeable battery within a reasonable time (for example, 12 to 24 hours). Said voltage desired value is often defined in a temperature dependent manner and frequently in such a manner that the gas build-up rate lies below a maximum design value in the middle of the defined temperature range. The z-curve that defines the equalizing charge can be obtained from the battery manufacturer or defined by the vehicle manufacturer in order to function well in a provided desired vehicle having a prescribed user profile.

The z-curve defines the voltage at the connection terminals of the battery. So as to control the primary electric current source in order to achieve a defined voltage at the battery connection terminals, it is possible to perform a feedback control procedure of the battery voltage or to perform a strategy that includes a control procedure with disturbance variable feedback, wherein said strategy sets the voltage desired value of the generator or DC-DC converter in relation to an entire vehicle current or in relation to the battery current.

In addition to the introduction in accordance with the invention of a risk minimizing strategy, warning indications can nevertheless be provided to the driver and/or service personnel in order to indicate to said persons that the battery is damaged. Since algorithms for identifying damaged batteries often generate error messages despite the battery being intact, it can however be provided that a warning indication is only generated in the dashboard and/or an error code stored in a diagnostic system if the evaluating unit has generated a defined number of alarm signals within multiple phases of the operation that follow one another chronologically. By way of example, an irregular charging procedure is only identified if at least one alarm signal that indicates a damaged battery has been generated three times in the last five operating phases. A vehicle-internal risk minimizing strategy can also only be introduced if the evaluating unit has generated a defined number of alarm signals within multiple phases of the operation of the vehicle that follow one another chronologically.

Further advantages, characteristics and further expedient developments of the invention are evident in the dependent claims and the illustration hereinunder of preferred exemplary embodiments with reference to the figures.

In the figures:

DETAILED DESCRIPTION

Figure 1:
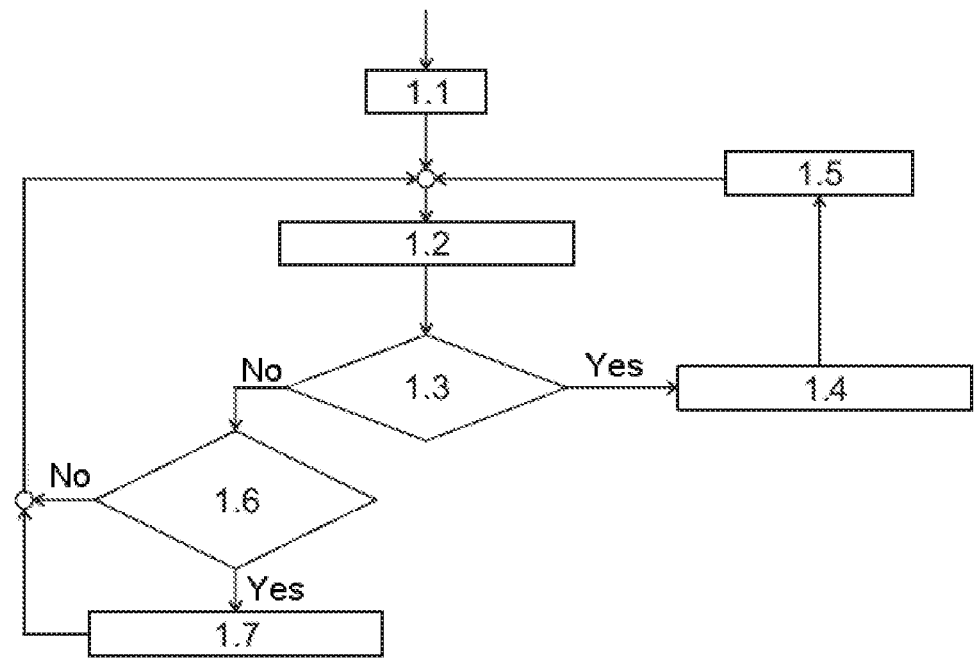
FIG. 1 illustrates an algorithm for limiting the charging current.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention is to be explained in an exemplary manner with reference to three possible risk minimizing strategies. On the one hand, these are measures that are introduced if a build-up of gas and/or internal short circuits of the battery are detected. In addition, preventative measures are introduced in order to disconnect the battery if the temperature of said battery is found to be outside a specific temperature window for a charging procedure. Furthermore, risk minimizing strategies are to be explained in the case of sulfation of the battery.

High gas build-up rates or internal short circuits are often accompanied in the case of batteries by an increased battery temperature gradient and a high charging current over the time. In order to identify these situations, these parameters can be monitored and various algorithms can be used. The respective algorithm then generates an alarm signal (indication/flag) if a build-up of gas or internal short circuits have been detected. The risk minimizing strategies in accordance with this invention can use an alarm indication of an evaluating unit and subsequently introduce corresponding remedial measures. However, the invention is not limited to determining a battery temperature gradient and a high charging current but rather it is possible to monitor any other parameters with which it is possible to conclude an intense build-up of gas and/or an internal short circuit.

Risk minimizing strategies in the case of a build-up of gas and internal short circuits can be organized differently, wherein there can be by way of example fundamental sub-strategies that control the current supply in order to limit or to prevent such a charging procedure of the battery. These sub-strategies can be activated and deactivated in dependence upon the operating mode of the vehicle or a history of the past operation of the vehicle. In addition, a communications strategy can be introduced that generates warning indications in the dashboard and stores error codes in a diagnostic system of the vehicle.

By way of example, it is possible to limit the charging current as a sub-strategy for controlling the current supply. In addition, the battery can be disconnected from the current supply by way of a relay or the vehicle can be shut down during the charging procedure at a plug socket. An algorithm for limiting the charging current reduces the voltage desired value that can be defined by means of a standard z-curve if the battery current exceeds a defined limit value.

This current limit value should limit the current to the battery to a sufficient extent in order to prevent increased temperatures and a build-up of gas. A limit value of 0A prevents a charging current entirely but does not allow a recharge of the battery if an internal short circuit is present. An easy positive calibration can therefore be the best compromise in order to stop a build-up of gas and thermal effects, while the battery simultaneously continues to be charged, until it is replaced.

In order to limit the charging current, an offset can be deducted from a voltage desired value that is determined from the z-curve so that the required voltage desired value is produced for the current limitation. FIG. 1 illustrates an algorithm for limiting current, wherein said algorithm calculates the offset UOffset in an adaptive manner if a more intense current flow has been identified. If a current limitation is activated, initially the value UOffset=0 is set in step 1.1. In addition, the value USetpoint=UNominal−UOffset is set in step 1.2 and thus the voltage desired value USetpoint is determined for the current limitation. If it is established in step 1.3 that the battery current $I_{Batt}$ is greater than the calibrated limit value CurrentLimitThresh, the algorithm increases in step 1.4 in each case the value UOffset by the calibrated value OffsetInc (UOffset=UOffset+OffsetInc). In this case, a time stamp is stored in step 1.5. During further measurements, the offset is further increased if the battery current exceeds the limit value CurrentLimitThresh and a fresh time stamp is stored. If this is no longer the case, the algorithm compares the most recent stored time stamp with the prevailing time. If the test in step 1.6 establishes that this difference exceeds a calibrated limit value DecrementTimeThresh (t−timestamp>CurrentTimeThresh), the offset is reduced by the calibrated value OffsetDec (step 1.7). This is repeated until the measured battery current again exceeds the limit value CurrentLimitThresh or the current limiting function is deactivated. The offset voltage that is calculated by means of this algorithm is added to a nominal voltage desired value of the z-curve.

A second risk minimizing strategy can provide that the battery is disconnected from the current supply system, which can occur by way of a relay. If the current for charging the battery and the power for a low voltage network is already provided by a DC-DC converter, the battery can be disconnected from the bus in a simple manner without manipulating the desired value. In order to keep the vehicle in a usable condition, the battery should be reconnected if the vehicle has been parked and the battery can be disconnected after start-ups that follow one another chronologically.

As long as the battery is disconnected, it cannot support high current transients of loads such as by way of example an electronic power steering system which could lead to a decrease in the power of loads of this type. Furthermore, if high current transients of this type occur, the voltage in the current distribution network drops to the extent that other electrical units of the vehicle lose their functionality. In the case of a distributed control device system in the vehicle, a transient can lead to the control device system being disconnected and restarted.

In order to solve this problem, the strategy can send a signal to components having high loads and to the load management system of the vehicle as long as the battery is disconnected. This signal can be used by high current loads to change their operating parameters in such a manner that the loads are operated in a weakened mode in which the performance is still maximized as before, yet high current transients are minimized. The signal can in addition be used by a load management system to deactivate non-essential loads. This minimizes the probability of the DC-DC converter demanding more power during the load transient than the DC-DC converter can provide. In this case, the voltage in the current distribution network would drop.

Figure 2:
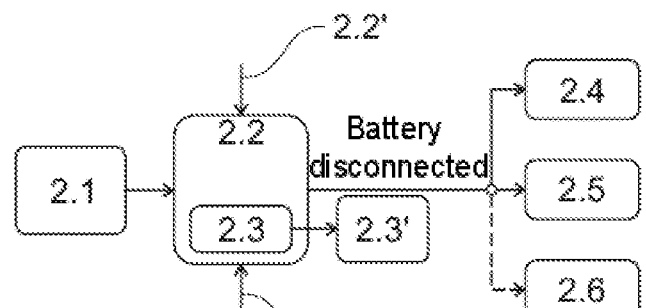
FIG. 2 illustrates an exemplary embodiment of the communication between algorithms for identifying irregular charging states, the risk minimizing strategy, the load management strategy and high loads.

FIG. 2 illustrates the communication between algorithms for identifying irregular charging states, the risk minimizing strategy, the load management strategy and high loads. An algorithm identifies in step 2.1 a build-up of gas and/or an internal short circuit at the battery. The risk minimizing strategy 2.2 furthermore provides that the battery is disconnected (2.3) which is performed by means of a relay (2.3'). The information regarding the vehicle activation state (activated/deactivated) (2.2') and the information regarding the vehicle start-up state (crank or start-up request/started) (2.2") is incorporated into the risk minimizing strategy.

The risk minimizing strategy furthermore transmits a signal with the information that the battery has been disconnected. This signal can be used by a load management system 2.4 of an electronic power steering system 2.5 and/or units having high loads 2.6 in order to minimize transients if this signal is activated.

If the battery and the electrical vehicle loads are supplied by way of a conventional generator during the journey, it is possible if a relay is present to use this risk minimizing strategy in order to disconnect the lead battery from the rest of the system. However, before the battery is disconnected, the generator desired value should be at least decreased to the idle running voltage of the battery in order to prevent load drops. This applies in particular for batteries that display an intense build-up or discharge of gas and draw high currents. After the battery has been disconnected, the desired value should again be increased to its nominal value.

Figure 3:
FIG. 3 illustrates a flow diagram of the steps when disconnecting the battery and raising and lowering the generator voltage desired value.

FIG. 3 illustrates the flow diagram of these steps. In step 3.1, an algorithm identifies an intense build-up of gas and/or an internal short circuit. In step 3.2, the generator desired value is at least reduced to the idle running voltage of the battery and the battery is disconnected in step 3.3. The generator desired value is subsequently increased to its nominal voltage in step 3.4.

The battery charging current drops to zero if the generator desired value is dropped to the idle running voltage. The control algorithm can monitor the battery current and bring about a disconnection of the battery by way of a relay if the battery current changes from charging to discharging.

If the battery of an electric vehicle or a hybrid vehicle is charged at a plug socket, the low voltage system is normally supplied by means of a DC-DC converter. The lead battery is normally connected to the low voltage system and is likewise charged. If an extreme build-up of gas or internal short circuits are identified while the vehicle is being charged at a plug socket, the risk minimizing strategy in addition terminates the rapid charging procedure and shuts down all vehicle systems. In this case, alarm indications should be activated in the dashboard and error codes should be stored in the diagnostic system in order to inform service personnel with regard to this procedure.

These sub-strategies that limit the charging procedure of a battery can be activated and deactivated in dependence upon the operating mode of the vehicle and the history of the past operation of the vehicle. In particular, a distinction is made between states in which the vehicle is charged at a plug socket or is being driven. In addition, the parameter with which an irregular charging procedure has been detected can have an influence. By way of example, this can be establishing an increased temperature gradient, establishing an increased charging current over time or establishing an internal short circuit.

Any strategy from the group: limiting charging current, disconnecting the battery or shutting down the vehicle can be used as a sub-strategy for controlling the current supply. In the case of an electric vehicle, the vehicle is shut down by way of example for each type of the irregular charging procedure if the vehicle is currently being charged at a plug socket. If the vehicle is traveling, a charging current limitation can be selected if an internal short circuit is detected. On the other hand, the battery can be disconnected if an increased temperature gradient is established. The reason for this approach is that over a short period of time a battery with an internal short circuit could be in the position to function without critical situations if the charging current is limited. A battery that in contrast constantly becomes hotter should be disconnected from the current supply even if this measure could reduce the performance of other systems.

The current supply control procedure can automatically be terminated if one or more of the following conditions occur:

The battery is replaced.

During the next key cycle or vehicle activating cycle or after the next one, two or more key cycles or vehicle activating cycles.

During the next journey if the vehicle was moving for a minimum period of time.

The first condition can be checked if the battery monitoring system comprises a battery time in the service timer. In addition, a mechanic that replaces a battery indicates by way of a maintenance interface that the battery has been replaced. The third condition can be implemented by virtue of the fact that a timer is started if the vehicle begins to travel and an irregular charging state has occurred in the past. The calibrated period of time should be sufficient to dissolve hydrogen gas that has collected in and around the battery.

If the risk minimizing strategy has not been terminated at the end of an activating phase of the vehicle, within which an irregular charging procedure has been detected, the type of the irregular charging procedure (high temperature gradient, internal short circuit etc.) is stored in a non-volatile storage device. Said storage device is used in order to determine the risk minimizing strategy with relation to the current controller if the vehicle is reactivated. In this manner, an irregular charging procedure is assumed by activation phases of the vehicle that follow one another chronologically until the conditions for a termination of the risk minimizing strategy are fulfilled.

Figure 4:
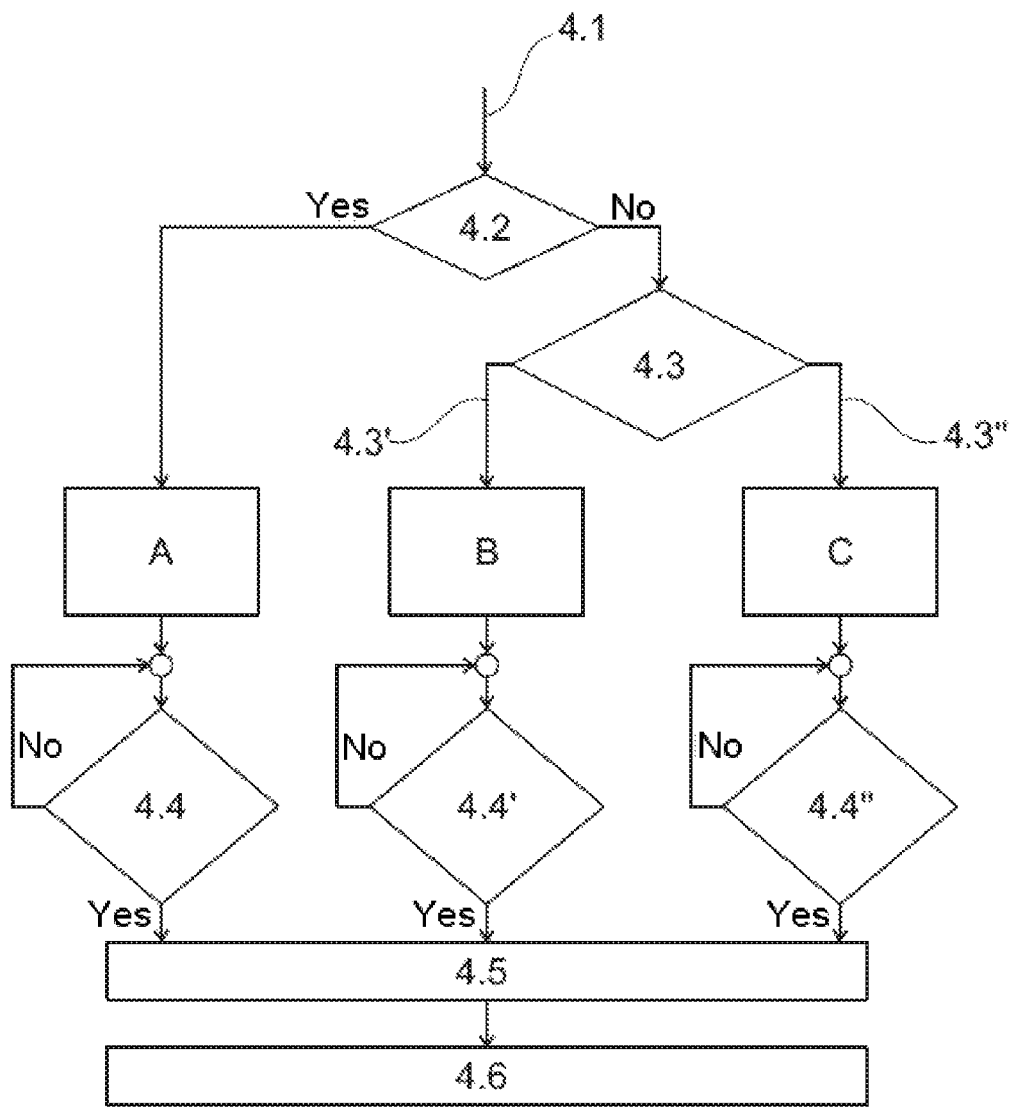
FIG. 4 illustrates an algorithm with the assumption of an irregular charging procedure and the termination of a risk minimizing strategy.

FIG. 4 illustrates an algorithm with the assumption of an irregular charging procedure and the termination of a risk minimizing strategy. In an exemplary manner, three measures A, B and C are available for controlling the current supply. Initially, an established irregular charging procedure of the type I is adopted in step 4.1 and a check is performed in step 4.2 as to whether the vehicle is currently being charged at a plug socket. If this is not the case, in step 4.3 a check is performed as to whether the additional set mode (accessory mode) is present or torque is already possible (torque ready). In the first case 4.3', the measure B is introduced while in the second case 4.3", the measure C of the risk minimizing strategy is introduced. The measure A of the risk minimizing strategy is introduced if the check in step 4.2 has established that the vehicle is currently being charged at a plug socket.

In the case of each measure A, B, C a check is performed in the respective steps 4.4, 4.4' and 4.4" as to whether the conditions for terminating the risk minimizing strategy have been fulfilled. If this is the case, the irregular charging procedure of the type I is canceled (4.5) and the normal current control procedure (4.6) is reinstated.

One communications strategy for minimizing risk in the case of a build-up of gas or internal short circuits can include control procedures under which conditions warnings are activated and deactivated by way of a dashboard or error code. Warnings on a dashboard can be generated immediately for any types of irregular charging states, after said states have been identified or the generation of said warnings can be delayed until the same result or similar results have been repeated. In this manner, erroneous alarms owing to erroneous messages can be filtered out. This would otherwise lead to high guarantee costs and customer dissatisfaction.

Since the risk minimizing strategies are designed so as to reduce those symptoms of the battery that are used for the purpose of detecting an irregular charging state, the event counter must be coordinated with the strategy. Since error codes are only read out if the vehicle is with a dealer or a mechanic, said error codes can be generated immediately or likewise only after the result is repeated.

In addition, batteries should be isolated or not used if the ambient temperature of the battery is outside the battery operating window. This can be provided as a preventative risk minimizing strategy. For lead batteries, the battery by way of example should be isolated by means of a zero current control procedure that prevents a charging current if the temperature exceeds 60° C. As a consequence, the battery is prevented from producing gas. In the case of a lithium ion battery, it is expedient to isolate the battery for very hot and very cold ambient temperatures. The batteries can be isolated by way of a relay from a current supply network or the voltage desired value of the current supply is controlled in such a manner that a charging current does not provide.

If the vehicle is currently being charged at a plug socket, a further preventative strategy can shut down all vehicle systems if the ambient temperature lies outside the permitted operating temperature for the batteries. In order to select this strategy, it must be established beforehand whether the vehicle is currently being charged and whether the ambient temperature lies within permissible limits.

Corrosion of a lead battery can be detected in particular by way of establishing a high internal resistance of the battery since said high internal resistance is an accompanying effect of corrosion. For this purpose, in one embodiment of the invention an algorithm is provided that measures the battery current and the battery voltage with a battery monitoring sensor if the vehicle loads are not supported by a generator or a DC-DC converter. This is the case by way of example if the vehicle is currently switching between a switch-on procedure and a switch-off procedure. It is preferred that the internal resistance is determined when cranking an internal combustion engine during a start-up procedure. In the case of an electrical vehicle or a vehicle without a conventional starter motor, the internal resistance of the battery can be determined preferably when closing a relay during the start-up procedure. In the two cases, the suitable point in time is selected by means of calibrating a current threshold value having the parameter name ICorrDischargeThresh. If the battery current changes, the internal resistance of the battery is determined by virtue of the fact that the resulting change of the battery voltage is divided by this change in the battery current (Internal resistance of the battery=USampleCharge−UBatt/ISampleCharge−IBatt).

The determined internal resistance of the battery can be standardized in relation to the prevailing state of charge and the temperature in order to estimate the resistance in the case of a standard state of charge and a standard temperature. By way of example, internal resistances that are calculated can be converted to resistances in the case of 100% SOC and 25° C. The standardization can be performed for example using a lookup table. The standardized internal resistance is then compared with a calibrated limit value in order to detect corrosion or sulfation.

If electric vehicles or hybrid vehicles are charged over a longer period of time at a plug socket, it is possible that transitions between switch-on procedures and switch-off procedures do not occur sufficiently frequently in order to determine the internal resistance of the battery at these opportunities. The algorithm can therefore also provide that one load is specifically activated while the generator or DC-DC converter is deactivated in order to continuously receive data regarding a defined discharging current level and to calculate therefrom the internal resistance of the battery. This load can be by way of example an available electrical component of the vehicle, wherein for this purpose by way of example a heated window pane can be used. However, an electrical resistance can also be used that is only installed in the vehicle for the purpose of establishing corrosion. In a further embodiment of the invention, it can be provided that the generator or DC-DC converter is periodically deactivated and reactivated or the voltage desired value is reduced and increased in order to induce a change in the battery current. It is thus possible to measure the resulting change of the battery voltage.

If the determined and preferably standardized internal resistance of the battery exceeds a defined limit value, the algorithm concludes therefrom an internal corrosion. However, in this case there is the problem that a high internal resistance of the battery can also have been caused by means of sulfation of the battery. This circumstance can lead to erroneous notifications relating to the corrosion. Sulfation of the battery can however be resolved in that an equalizing charging occurs over a specific period of time. If the high internal resistance was caused by means of sulfation of the battery, the resistance should decrease again after performing the equalizing charging procedure. If this is not the case, but rather the internal resistance remains high, it can be assumed that said resistance was caused as a result of corrosion. In this case, the risk minimizing strategy can be introduced for an established corrosion.

Figure 5:
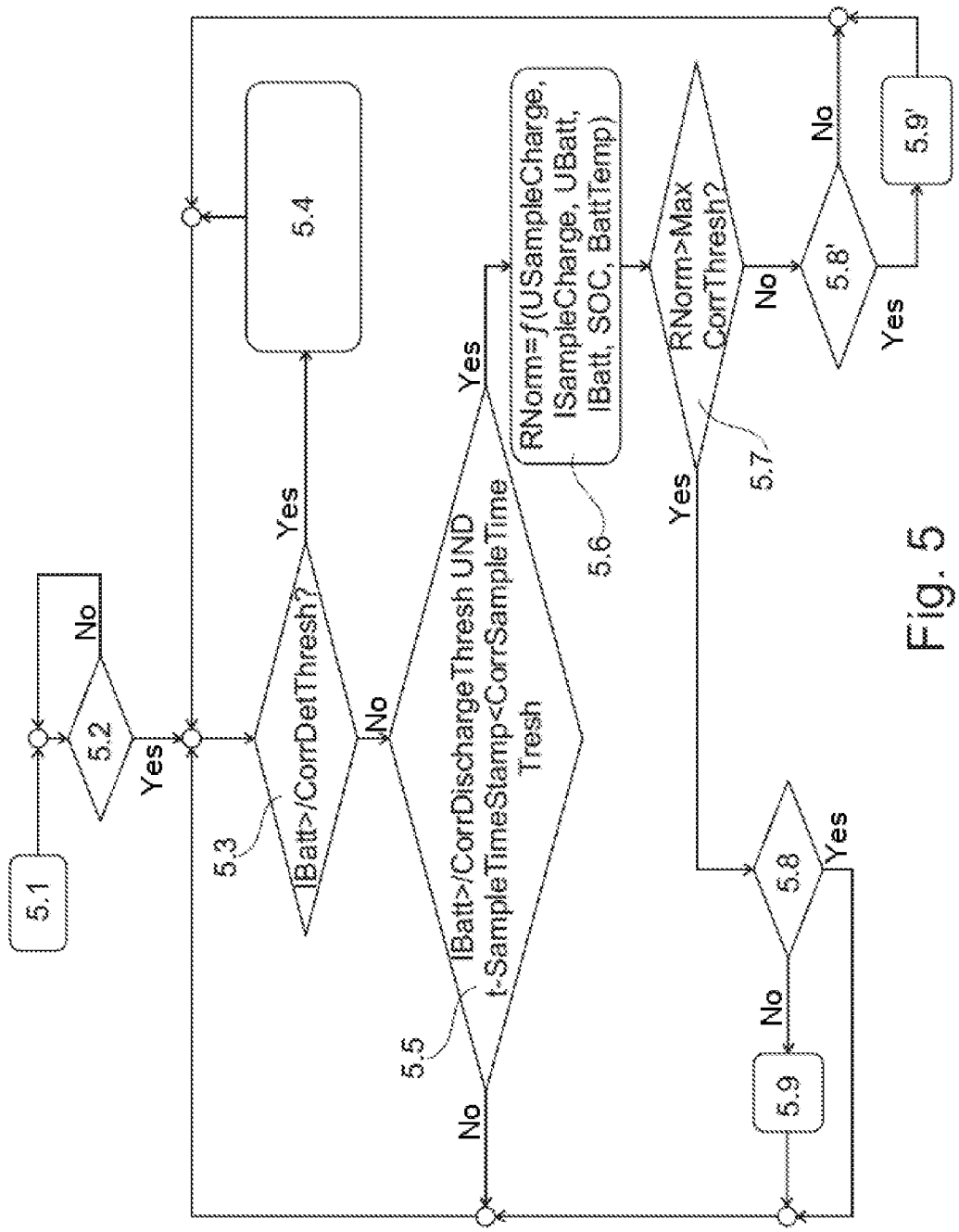
FIG. 5 illustrates an algorithm for establishing a high internal resistance of a battery and for requesting a desulfation procedure.
Figure 6:
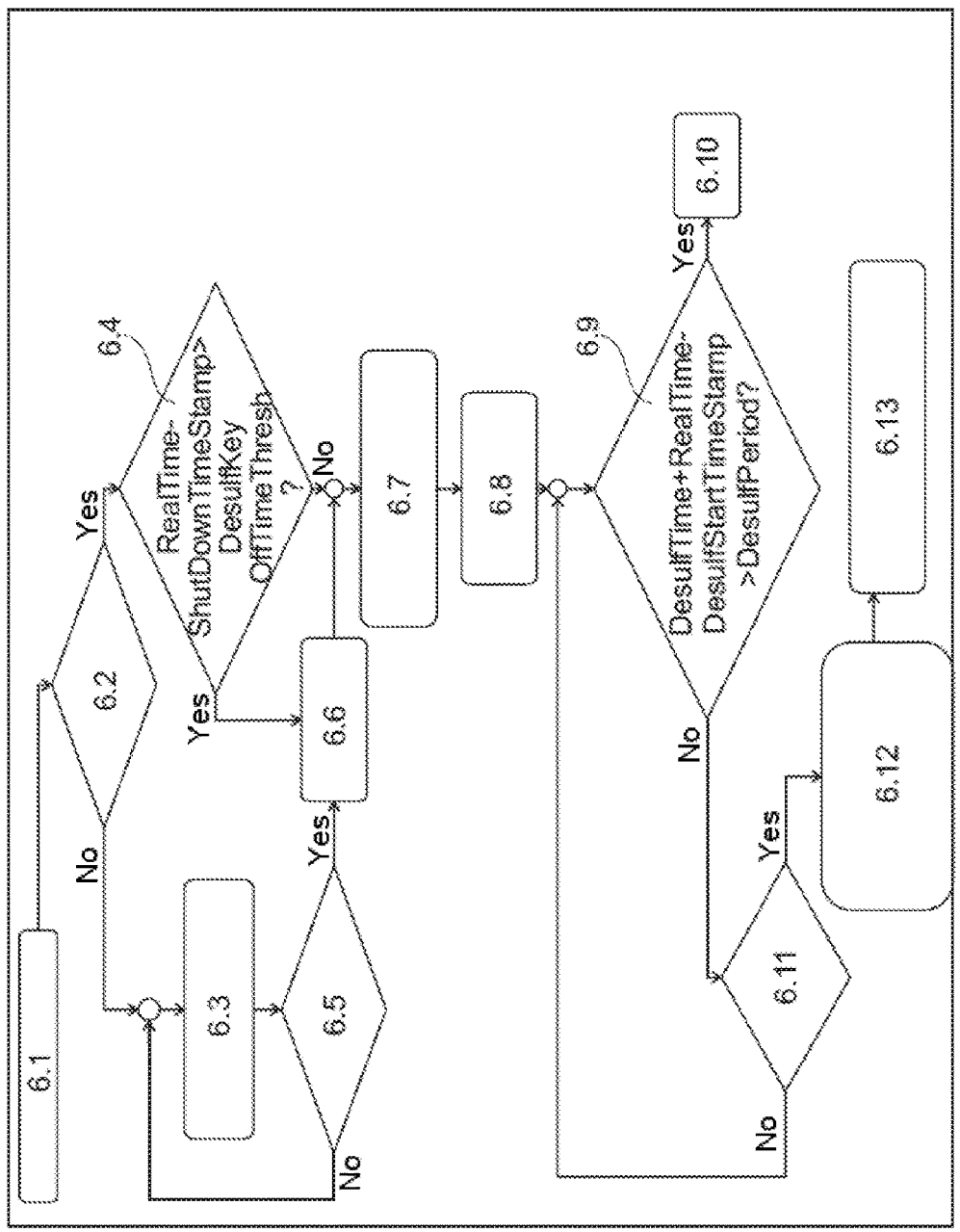
FIG. 6 illustrates an algorithm for establishing a high internal resistance of a battery and for performing a desulfation procedure.
Figure 7:
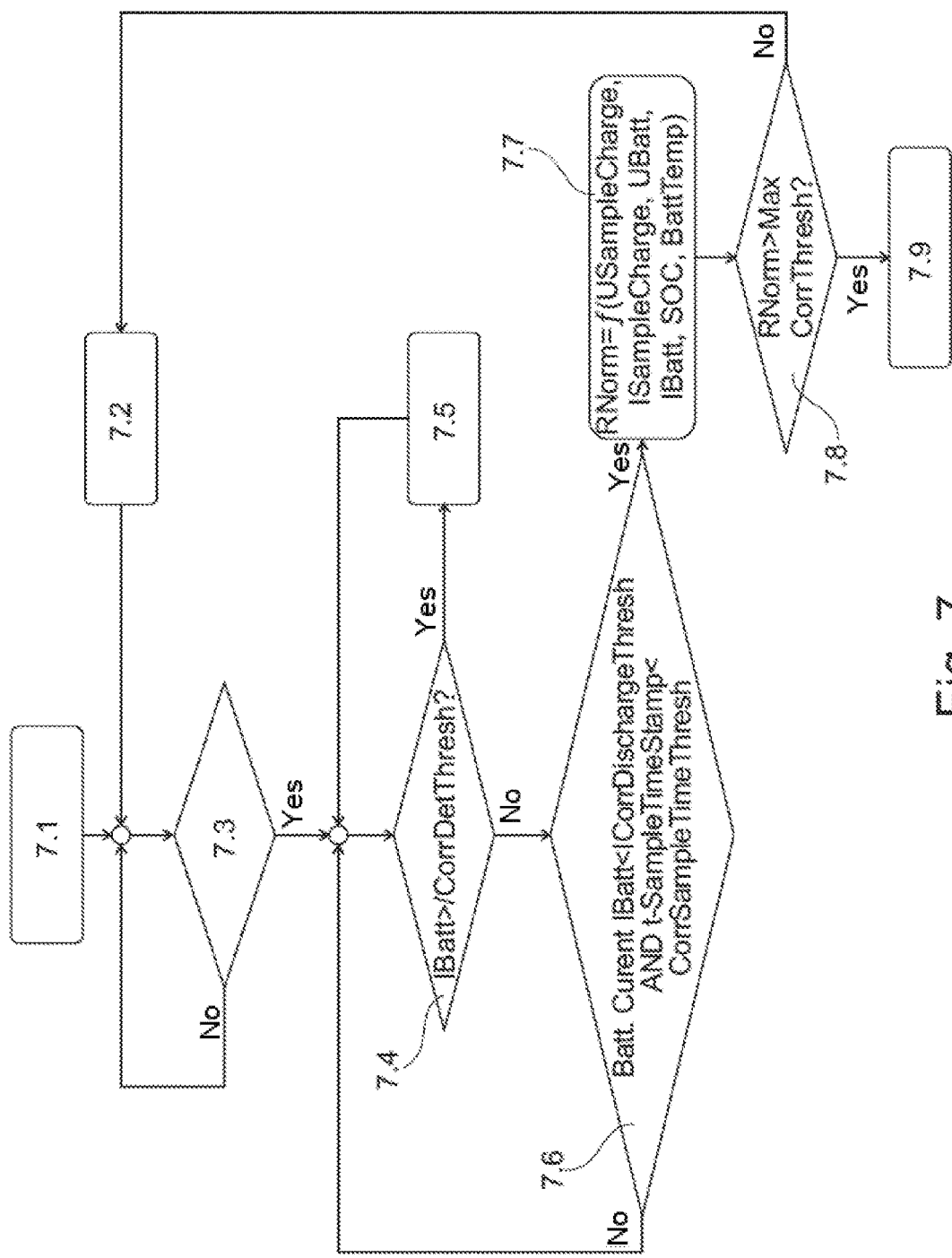
FIG. 7 illustrates a procedure that determines whether the previously established increased internal resistance of the battery has been reduced by means of the desulfation procedure that has been performed.

Algorithms for establishing a high (standardized) internal resistance of a battery and for performing a desulfation procedure in order to exclude sulfation of the battery as a cause for the high internal resistance or to rectify said sulfation are illustrated in FIGS. 5, 6 and 7 in an exemplary manner. The algorithm in FIG. 5 is used so as to establish an increased internal resistance of the battery and to introduce a desulfation procedure. The procedure activates the current supply in step 5.1. In step 5.2, a check is performed as to whether an indicating flag for a desulfation procedure that has been performed has been deactivated. If this applies, a check is performed in step 5.3 as to whether the battery current IBatt lies above a limit value ICorrDetThresh. If this is the case, in step 5.4 the battery voltage and the battery current is set to the parameters USampleCharge=UBatt and ISampleCharge=IBatt and a time stamp SampleTimeStamp is stored. If, on the other hand, this is not the case, in step 5.5 a check is performed as to whether the battery current lies below a second limit value ICorrDischargeThresh and simultaneously whether the difference from the prevailing time and the stored time stamp SampleTimeStamp lies below a limit value CorrSampleTimeThresh (t−SampleTimeStamp<CorrSampleTimeThresh). If this is the case, in step 5.6, the internal resistance of the battery is formed by means of the quotient (USampleCharge−UBatt)/(ISampleCharge−IBatt) and in this exemplary embodiment is also standardized in relation to the state of charge of the battery and the battery temperature. If this value RNorm lies above a limit value MaxCorrThresh (step 5.7), this is evaluated as an increased internal resistance of the battery. If the check in step 5.8 establishes that an indicating flag has not yet been activated to request a desulfation procedure, this occurs in step 5.9. This check occurs likewise in step 5.8' if the internal resistance of the battery does not exceed the mentioned limit value MaxCorrThresh. If the check in step 5.8' establishes that an indicating flag for requesting a desulfation procedure has been activated, this indication is deactivated in step 5.9'.

An indicating flag for requesting a desulfation procedure can however also be generated by means of other algorithms. In particular, said indicating flag can be generated periodically if by way of example a specific time has elapsed since the last desulfation procedure.

FIG. 6 illustrates an algorithm that performs a desulfation procedure as soon as said procedure is requested. This procedure is performed if by way of example a corresponding indicating flag for requesting a desulfation procedure has been activated by the algorithm in FIG. 5 or an indicating flag of this type has been set periodically. The algorithm provides that the current supply is activated in step 6.1. In step 6.2, a check is then performed as to whether an internal indicating flag for requesting a desulfation procedure has already been activated. If this is not the case, in step 6.3 the normal current supply management strategy is implemented and in step 6.5 it is furthermore determined whether an internal indicating flag for requesting a desulfation procedure has been activated.

The variable DesulfTime represents the time span that a desulfation procedure has already taken place. This variable is stored in a non-volatile storage device so that said variable is stored during each shut down procedure of the vehicle and can be updated when the vehicle is next activated. If it is established in step 6.5 that an indicating flag for requesting a desulfation procedure has been activated, the variable DesulfTime=0 is set (step 6.6). If, on the other hand, it is established in step 6.2 that when the current supply is activated an indicating flag for requesting a desulfation procedure was already activated, in other words a desulfation procedure is already in progress, in step 6.4 the time since the last shut down is compared with a calibrated limit value DesulfKeyOffTimeThresh. For this purpose, when shutting down the vehicle, a time stamp is set and the difference between the prevailing time and this time stamp is compared with the limit value (RealTime−DesulfShutDownTimeStamp>DesulfKeyOffTimeThresh?). If the time since the last switch-off procedure exceeds this limit value, it is assumed that the duration of the switch-off procedure was too great since a significant discharge could have occurred. It is preferred that the desulfation procedure that has already started is then not continued but rather started afresh. In this case, the variable DesulfTime=0 is therefor also set (step 6.6).

A desulfation procedure is consequently performed if an indicating flag for requesting a procedure of this type is set. A further condition for activating a desulfation procedure can be that the vehicle is in a specific operating mode. In the case of plug-in vehicles, this can be by way of example the state of charge at the plug and driving without being connected to a plug socket. A condition of this type is not provided in the algorithm in FIG. 6 however said condition can be optionally requested by way of example in the steps 6.2 and 6.5. Consequently, the procedure for this embodiment of the algorithm only moves to the steps 6.4 or 6.6 if an indicating flag for requesting a desulfation procedure is activated and the vehicle is simultaneously in a specific operating mode.

Prior to beginning the desulfation procedure, it is preferred for each of the mentioned variants that a time stamp be set to the prevailing time (6.7) and then the voltage desired value is used in step 6.8 for the desulfation procedure. The time DesulfTime of the desulfation procedure is monitored. As soon as said time achieves a limit value DesulfPeriod, an indicating flag is set that indicates that the desulfation procedure has been terminated. If the comparison in step 6.9 (DesulfTime+RealTime−DesulfStartTimeStamp>DesulfPeriod?) establishes consequently that the limit value has been achieved, in step 6.10 the indicating flag for indicating that a desulfation procedure has occurred is activated (DesulfatedFlag) and the indicating flag for requesting a desulfation procedure is deactivated.

If, on the other hand, the limit value DesulfPeriod has not yet been achieved, the desulfation procedure continues and a check is continuously performed in Step 6.11 as to whether the current supply has been disconnected. As soon as this is the case, the prevailing value of the variables DesulfTime are stored in a non-volatile storage device (DesulfTime=DesulfTime+RealTime−DesulfStartTimeStamp). In addition, the prevailing time is also stored in a non-volatile storage device as a time stamp for the switch-off procedure of the vehicle (DesulfShutDownTimeStamp). This time stamp can be used when next starting the vehicle in step 6.4.

If an increased (standardized) internal resistance of the battery is established, a desulfation procedure is consequently performed. This procedure preferably includes charging the battery with a voltage desired value that corresponds at least to the equalizing charge of the battery. The desulfation procedure is performed over a defined time span and the indicating flag (DesulfatedFlag) from step 6.10 in the algorithm in FIG. 6 provides that said desulfation procedure is performed until the end. After the desulfation charging procedure, the increased internal resistance should be reduced. If this is not the case, the state was probably caused as a result of corrosion or another battery malfunction. The battery should then be checked and where necessary replaced.

FIG. 7 illustrates a procedure that determines whether the previously established increased internal resistance of the battery has been reduced by means of the desulfation procedure that has been performed. If the increased internal resistance has been caused as a result of sulfation of the battery, it would be possible to eliminate said sulfation. However, if the increased internal resistance has not been caused as a result of sulfation, it is concluded therefrom that corrosion or another malfunction of the battery has occurred. The procedure starts afresh with an activation of the current supply at (step 7.1). As soon as it is established in step 7.3 that the indicating flag for indicating that a desulfation procedure has been performed is activated (DesulfatedFlag), a check is performed in step 7.4 as to whether the battery current lies above the limit value ICorrDetThresh (first current threshold). As soon as this is the case, in step 7.5 USampleCharge=UBatt and ISampleCharge=IBatt are set and a time stamp SampleTimeStamp is set.

However, as soon as the check in step 7.4 has established that the battery current lies below the threshold value ICorrDet Thresh, a further check is performed in step 7.6 as to whether the battery current IBatt also lies below a threshold value ICorrDischargeThresh (second current threshold) and simultaneously the difference between the time and the time stamp is less than a limit value CorrSampleTimeThresh (time threshold). If these two conditions are fulfilled, the preferably standardized internal resistance RNorm is calculated in step 7.7. The internal resistance is determined as a quotient (USampleCharge−UBatt)/(ISampleCharge−IBatt), and said internal resistance is standardized to a nominal state of charge and a nominal temperature. In step 7.8, the (standardized) internal resistance is compared with a limit value MaxCorrThresh. If the internal resistance is actually greater than the limit value, corrosion is identified which in step 7.9 leads to activating a corresponding indicating flag (BattMaintenanceReqFlag). This indicating flag should indicate that maintenance of the battery should take place. The indicating flag can cause by way of example a warning notification to be displayed in the dashboard of the vehicle. In addition, error codes can be generated in a diagnostic system of the vehicle as a result of said indicating flag and said error codes can be read by qualified personnel.

If, on the other hand, the internal resistance is less than the limit value MaxCorrThresh, the indicating flag for indicating that a desulfation procedure has been performed is deactivated only in step 7.2 (DesulfatedFlag). The reason for this is that the increased internal resistance in this case is clearly caused as a result of sulfation that can be eliminated by means of a desulfation procedure, it is not necessary to maintain the battery. It is thus possible for unnecessary alarm notifications to be avoided.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a battery; and
    one or more controllers programmed to
        in response to an internal resistance value of the battery exceeding a limit value, perform a desulfation procedure by charging the battery at a voltage at least equal to a temperature dependent target value that permits all cells of the battery to be completely charged within a predetermined time period to of the battery within the predetermined time period,
        after completion of the desulfation procedure, activate a current supply, and in response to a time difference, between battery current exceeding a first current threshold and falling below a second current threshold, being less than a time threshold, update the internal resistance value, and
        in response to the updated internal resistance value still exceeding the limit value, generate an alarm.

2. The vehicle of claim 1, wherein the one or more controllers are further programmed to reduce a charge current of the battery based on monitored parameters that represent a state of the battery after the desulfation procedure.

3. The vehicle of claim 1, wherein the one or more controllers are further programmed to disconnect the battery from the current source based on monitored parameters that represent a state of the battery after the desulfation procedure.

4. A method for a vehicle comprising:
    in response an internal resistance value of a battery exceeding a limit value, performing a desulfation procedure by charging the battery at a voltage at least equal to a temperature dependent target value that permits all cells of the battery to be completely charged within a predetermined time period to equalize charge of the battery within the predetermined time period,
        after completion of the desulfation procedure, activating a current supply, and in response to a time difference, between battery current exceeding a first current threshold and falling below a second current threshold, being less than a time threshold, updating the internal resistance value, and
        in response to the updated internal resistance value still exceeding the limit value, generating an alarm.

5. The method of claim 4 further comprising reducing a charge current of the battery based on monitored parameters that represent a state of the battery after the desulfation procedure.

6. The method of claim 4 further comprising disconnecting the battery from the current source based on monitored parameters that represent a state of the battery after the desulfation procedure.

* * * * *